United States Patent [19]

Piening

[11] 4,262,867
[45] Apr. 21, 1981

[54] APPARATUS FOR MODIFYING POSITION AND ATTITUDE OF A SPACECRAFT

[75] Inventor: Helmut Piening, Munich, Fed. Rep. of Germany

[73] Assignee: Messerschmitt-Bölkow-Blohm, Munich, Fed. Rep. of Germany

[21] Appl. No.: 971,786

[22] Filed: Dec. 21, 1978

Related U.S. Application Data

[63] Continuation of Ser. No. 763,634, Jan. 28, 1977, abandoned.

[30] Foreign Application Priority Data

Feb. 3, 1976 [DE] Fed. Rep. of Germany ....... 2604005

[51] Int. Cl.³ ............................................. B64G 1/24
[52] U.S. Cl. ................................... 244/168; 136/245; 244/173
[58] Field of Search .................... 244/168, 173; 136/89 SA, 89 P, 89 DS

[56] References Cited

U.S. PATENT DOCUMENTS

| 3,116,035 | 12/1963 | Cutler | 244/168 |
| 3,145,948 | 8/1964 | Kershner | 244/168 |
| 3,239,165 | 3/1966 | Sohn | 244/168 |
| 3,304,028 | 2/1967 | Nicklas et al. | 244/168 |
| 3,348,374 | 10/1967 | Schalkowsky | 244/168 |
| 3,510,086 | 5/1970 | Arbeitlang et al. | 244/173 |
| 3,677,508 | 7/1972 | Dillard et al. | 244/173 |
| 3,948,468 | 4/1976 | Anchutin | 244/173 |

Primary Examiner—Charles E. Frankfort
Attorney, Agent, or Firm—Toren, McGeady and Stanger

[57] ABSTRACT

The position and attitude of a spacecraft is modified by selectively adjusting the positions of panels and vanes extending from the spacecraft body, relative to the direction of the ambient solar radiation.

17 Claims, 5 Drawing Figures

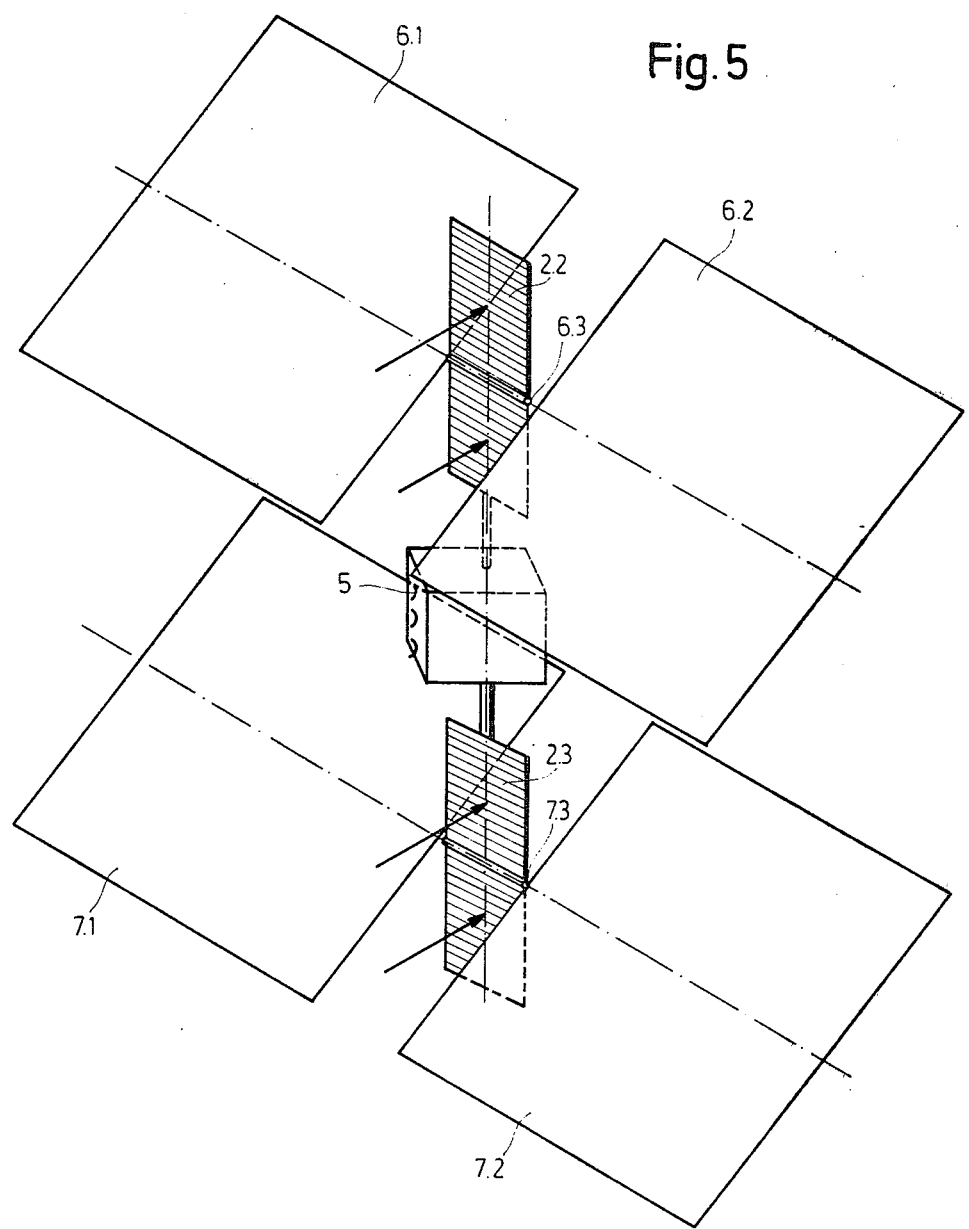

APPARATUS FOR MODIFYING POSITION AND ATTITUDE OF A SPACECRAFT

This is a continuation of application Ser. No. 763,634, filed Jan. 28, 1977 and now abandoned.

This invention relates to an apparatus for influencing or modifying the position and attitude of an orbitally traveling spacecraft or satellite.

Orbiting spacecraft usually perform specific assignments, such as those having to do with communication, weather observation, etc. Depending upon its purpose, the spacecraft must always assume a predetermined attitude relative to the earth and the orbital plane so that devices, such as antennas or optical recording instruments, always face the earth during each revolution. Furthermore, the spacecraft must orient the surface of any existing solar energy transducers, such as solar cells, solar battery panels or solar panels, to face the sun. In order to determine and regulate the respective positions and attitudes of satellites, control systems within the satellite and on the ground normally supply control signals when the spacecraft deviates more than a predetermined amount from a given position and attitude at any time. These signals actuate devices that modify the position and attitude of the satellite. The control system may, for example, respond to the deviation by producing a signal which rotates a flywheel about the pitch axis, which actuate coils operating on the principle of a DC motor, or which actuate jet nozzles that rotate the spacecraft about the roll or yaw axis. This is disclosed in AIAA Paper No. 75/1058.

Essentially, sensors in the spacecraft develop an indication of the position and attitude of the spacecraft. The control system either transmits this information to ground or utilizes it within the spacecraft. The control system or a ground station then develops commands for repositioning or reorienting the spacecraft and energize devices such as jet nozzles which propel or otherwise move the spacecraft into the desired position and attitude.

Flywheels, magnet coils or jet nozzles operated in a control loop utilize substantial amounts of energy to move the spacecraft. The energy is normally provided in the form of large solar cells, batteries, fuel cells, fuel, liquid gas, etc., all of which must be loaded aboard the satellite before launching. The energy supply and the dimensions of the containers for the energy sources not only substantially affect the operational life of the satellite, but varies its initial weight, and thus the size and cost of the launch and booster rockets, and ultimately the cost of the entire satellite project.

An object of the invention is to improve attitude and position control equipment.

Another object of the invention is to provide a device for modifying the position and attitude of a spacecraft, which device requires less expenditure of energy than presently known devices.

SUMMARY OF THE INVENTION

According to a feature of the invention, these objects are achieved, in whole or in part, by mounting solar radiation responsive means, having an operating surface responsive to pressure from solar radiation, from the outer walls of the satellite and varying the component of the surfaces normal to the solar radiation and the offset of the surface from the center of gravity of the spacecraft so as to provide translatory forces, torque, or both, which act on the satellite.

According to another feature of the invention the solar radiation responsive means include a plurality of structures mounted for movement relative to the outer walls of the satellite, each having an operation surface responsive to pressure from solar radiation.

According to another feature of the invention, each of the structures is movable so that its operating surface tilts relative to the normal incidence of the solar radiation. By normal incidence is meant the surface's component or projection plane normal to the solar radiation. This is also called the "normal plane" or the "capture cross section".

According to another feature of the invention the structures are arranged so that the normal surface is offset from the satellite's center of gravity relative to the radiation, as a result of which a torque is produced on the satellite.

According to yet another feature of the invention, the solar responsive means includes structures whose normal planes have centers aligned with the center of gravity of the spacecraft along the solar radiation so as to provide a purely translatory displacement of the spacecraft.

According to another feature of the invention, the structures include flaps of sheet steel or foil, vanes, plates, panels, or wafers.

According to another feature of the invention, each of the structures is covered with solar cells of the thin film or single crystal array type.

According to another feature of the invention, the solar radiation responsive means includes two panels extending out of the outer walls of the spacecraft in opposite directions. One of the panels faces the solar radiation but is tilted therefrom in one direction while the other faces the solar radiation but is tilted therefrom in the other direction. Thus the panels together form a propeller which allows the solar radiation to roll the spacecraft.

According to another feature of the invention, the solar radiation responsive means includes a pair of vanes articulatable relative to the spacecraft and into positions facing the solar radiation at various angles.

According to another feature of the invention, the radiation responsive means is formed of accordion-folded extensible panels projecting in opposite directions from the spacecraft.

According to another feature of the invention, the solar radiation responsive means include a pair of panels extending in opposite directions from the spacecraft walls and movable toward and away from the spacecraft.

According to another feature, the panels extending from the spacecraft support other sheets movable to various angles facing the solar radiation.

These and other features of the invention are pointed out in the claims. Other objects and advantages of the invention will become evident from the following detailed description when read in light of the accompanying drawings.

BRIEF DESCRIPTION OF THE DRAWINGS

In the drawings:

FIG. 5 is a graph illustrating a satellite utilizing panels for producing rotational as well as translatory motion and embodying features of the invention.

DETAILED DESCRIPTION OF PREFERRED EMBODIMENTS

Figure 1:
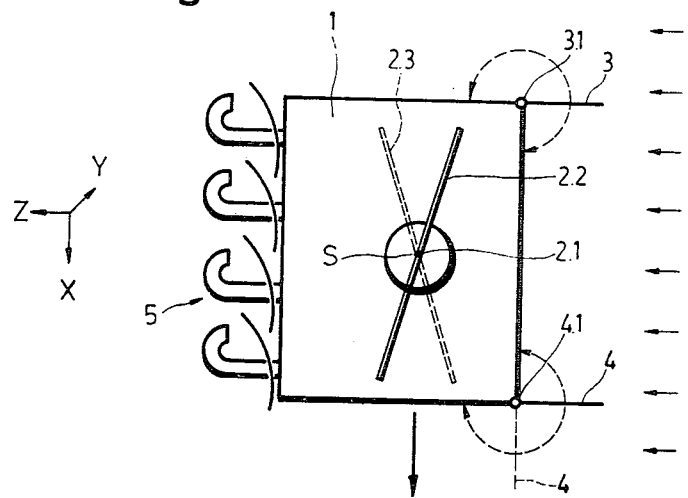
FIG. 1 shows a satellite with adjustable solar responsive means embodying features of the invention.

FIG. 1 illustrates a satellite or spacecraft 1 following an orbital path indicated by the large arrow. The satellite 1 continuously directs its antennae 5 toward the earth. The satellite is irradiated by the sun from the direction indicated by the small arrows. The satellite 1 supports two solar cell panels 2.2 and 2.3 rotatable along an axis 2.1 (the y axis perpendicular to the page) extending perpendicular to the trajectory and the through center of gravity of the satellite. One panel 2.2 is mounted above the main body of the satellite and the other 2.3 is mounted below the main body. Two edges of the main body of the satellite 1 extend parallel to the y axis and support two operating vanes 3 and 4 which rotate about axes 3.1 and 4.1.

It is possible to rotate the satellite about the z axis (i.e. achieve a yawing movement) by adjusting the solar panels 2.2 and 2.3 relative to each other so that their surface normals (i.e. their axes normal to their surfaces) do not extend parallel to the solar radiation. To this end the upper solar panel 2.2 is rotated in a direction opposite to the lower solar panel 2.3 until they reach positions similar to that shown in FIG. 1. As a result the solar radiation causes the entire arrangement to behave like a propeller in an air current.

Figure 3:
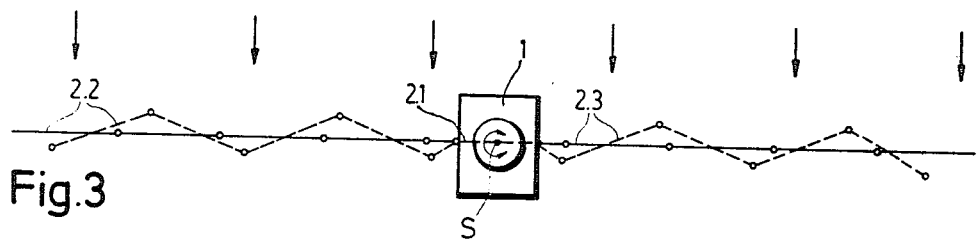
FIG. 3 illustrates a spacecraft embodying features of the invention and including a plurality of accordion foldable and unfoldable solar panels.
Figure 2:
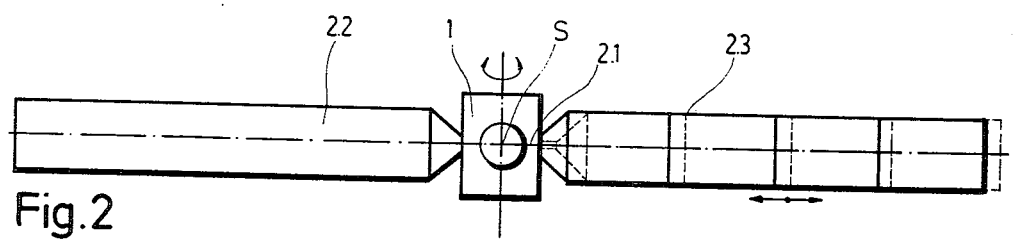
FIG. 2 is a view of a spacecraft showing solar panels displaceable along an axis and embodying features of the invention.

Rotation of the satellite 1 about the y axis (a pitching movement) can be achieved by varying the area of the "normal incidence" of solar radiation upon the vanes, i.e. the area of a projection of the vane upon a plane normal to the radiation, and the distribution about the center of gravity. Moving the surface 4 into the position indicated by the broken line, causes the solar radiation pressure to turn the satellite clockwise about the y axis. Rolling motion, rotation about the x axis is achieved by the embodiments illustrated in FIGS. 2 and 3. In FIG. 2, the distances of the solar panels 2.2 and 2.3 from the satellite 1 are variable. Thus the forces produced by the solar radiation pressure may act upon the satellite over two lever arms or different sizes and rotates the satellite. According to the embodiment of FIG. 3, the same effect is achieved by making the solar panels foldable and unfoldable like an accordion.

Figure 4:
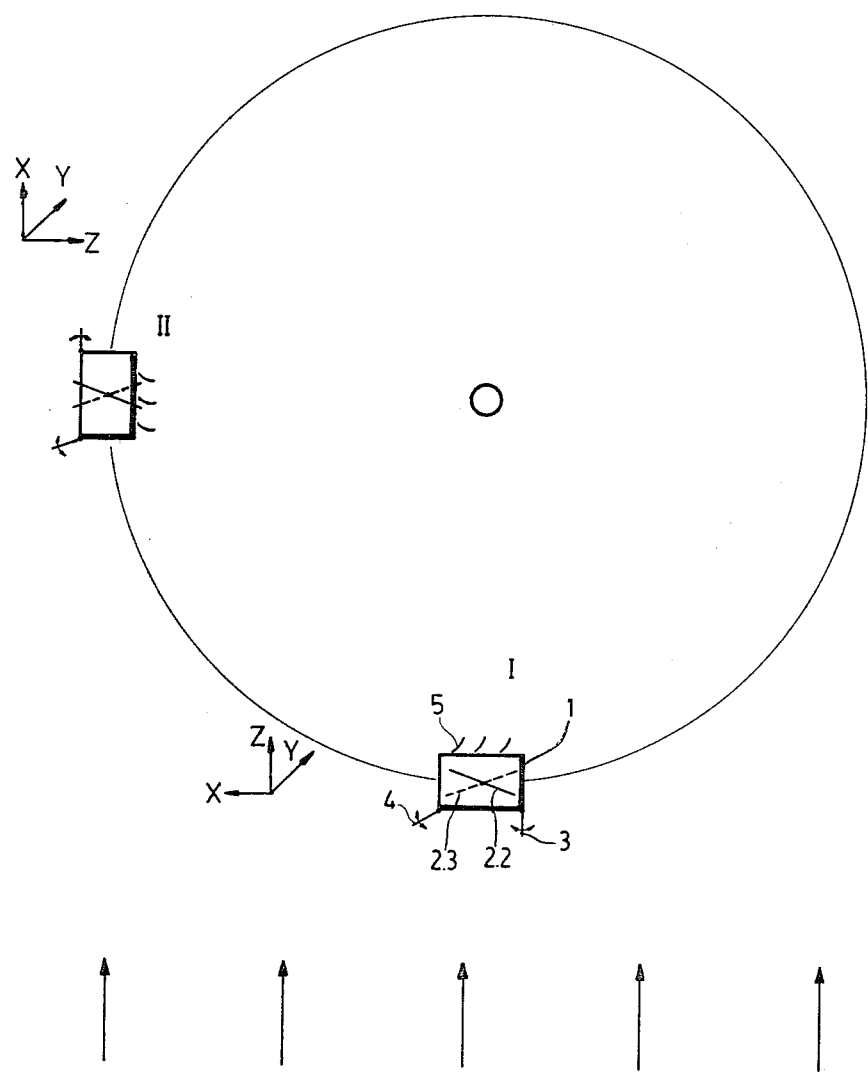
FIG. 4 is a graph illustrating the movement of a satellite about the earth.

FIG. 4 illustrated the attitude changes of a satellite in orbit. The antennas 5 of the satellite 1 point toward the earth, both in position I and in position II. The solar panels 2.2 and 2.3 are always directed toward the sun. However, the satellite itself must rotate about the y axis 90° during its movement from position I to II. This rotation is performed by the operating vanes 3 and 4.

If some sort of interference influences the attitude of the satellite, the vanes and panels, according to the invention, compensate for such interference. Thus, for example, to compensate for one type of motion, slight obliquity of the solar panels 2.2, 2.3 in opposite directions produces a moment which causes a yawing motion at noon and at midnight (position I) in an orbiting geostationary satellite and a rolling motion in the morning and in the evening (position II). The satellite compensates for pitching motions by rotating the operating vanes 3 and 4.

It should be noted that rotation of the vanes and panels, as well as the axial or accordion movement of the panels is accomplished by the various hinges and stems illustrated at 2.1, 3.1, and 4.1 in response to a control system with stepping motors in the interior of the satellite 1.

FIG. 5 illustrates an arrangement for operating sheets which permit translatory displacement of a satellite even in directions which do not coincide with the direction of solar radiation. To this end, operating sheets 6.1, 6.2, 7.1, and 7.2 are rotatably mounted on adjustable solar panels 2.2 and 2.3 and are held by stems so that they can be inclined about axes 6.3 and 7.3. These extend perpendicular to the surface normals of the solar panels 2.2 and 2.3, i.e. parallel to the plane of the solar panels. If the functional surfaces 6.1, 6.2, 7.1, and 7.2 are adjusted as shown, i.e., with the same angle to the solar radiation, which is illustrated by the arrows, then the satellite is displaced with a directional component perpendicular to the solar radiation.

The invention is based upon the recognition that the solar radiation pressure on a spacecraft increases with altitude. In "Kommerzielle Satelliten" published by Oldenbourg Verlag of Munich and Vienna in 1969, the author Friedrich Vilbig points out on pages 75 and 76 that the solar radiation pressure can substantially disturb the orbit of the spacecraft particularly of balloon satellites at altitudes of 1500 km, if the ratio between the surface and mass of the balloon exceeds 25 cm$^2$/q. Calculations indicate that a balloon whose diameter is approximately 30 meters traveling at an altitude of about 1500 km, may experience orbital variations approximately 6 km per day. According to the invention this effect of solar radiation, which was hitherto considered to be a disruptive influence, is used for modifying the position and attitude of a spacecraft.

The solar radiation pressure on a black body in the vicinity of the earth is approximately $0.45 \cdot 10^{-9}$ N/cm$^2$. Outside the terrestial atmosphere, the short wave portion of the electromagnetic spectrum, as well as particle radiation, increases the radiation pressure. At higher altitudes, the radiation pressure outweights the effect of irregularities of the gravitational field, as well as the magnetic field of the earth.

The invention operates because even minor deviation in the size and distribution about the center of gravity of the satellite, of the normal incidence of solar radiation upon the panels, i.e., the "normal plane" or the "capture cross section", produces a torque which turns the satellite.

Control circuits or arrangements, used within a spacecraft, for responding to external stimuli and actuating devices, such as nozzle, that rotate or translatorily move satellites are well known. Such control circuits can be used to actuate the vanes, panels, and sheets of the present invention. Examples of these circuits or arrangements are disclosed in U.S. Pat. No. 2,973,162 and the aforementioned AIAA paper.

While embodiments of the invention have been described in detail, it will be evident to those skilled in the art that the invention may be embodied otherwise without departing from its spirit and scope.

What is claimed is:

1. An apparatus for modifying the position and attitude of a spacecraft subject to solar radiation and having a body with outer walls, comprising solar radiation responsive means responsive to pressure from the solar radiation directed toward the satellite body, support means for movably mounting said radiation responsive means on the body outside the walls at positions offset from the center of gravity of the body, and for adjusting the radiation responsive means so as to change the area of normal incidence of radiation upon said radiation responsive means, said radiation responsive means including a pair of panels and a plurality of sheets, said panels being mounted away from the body and including a pair of stems mounted on each one of said panels, said stems articulatably supporting said sheets on said panels, said stems each having an axis in the plane of one of the panels, said panels being rotatably mounted on the body about a second axis transverse to the first axis, said stems having portions extending beyond the panels, said sheets being mounted for rotation on the portions of said stems extending beyond the panels.

2. An apparatus as in claim 1, wherein said panels and sheets have flat operating surfaces.

3. An apparatus as in claim 2, wherein said operating surfaces are composed of solar cells.

4. An apparatus as in claim 2, wherein said panels are solar panels having solar cells.

5. An apparatus as in claim 4, wherein said solar cells form an array of single crystals.

6. An apparatus as in claim 4, wherein said solar cells are of the thin film type.

7. An apparatus for modifying the postion and attitude of a spacecraft subject to solar radiation and having a body with outer walls, comprising solar radiation responsive means responsive to pressure from the solar radiation directed toward the satellite body, support means for movably mounting said radiation responsive means on the body outside the walls at positions offset from the center of gravity of the body, and for adjusting the radiation responsive means so as to change the area of normal incidence of radiation upon said radiation responsive means, said radiation responsive means including a pair of panels and a plurality of sheets, said panels being mounted away from the body and including a pair of stems mounted on each one of said panels, said stems articulatably supporting said sheets on said panels, said stems each having an axis in the plane of one of the panels, said panels being rotatably mounted on the body about a second axis transverse to the first axis, said panels and said sheets each having an edge portion and a central portion surrounded by the edge portion, said stems each having an axis extending through the central portions of the sheets and the panels.

8. An apparatus as in claim 7, wherein said panels are solar panels including a plurality of solar cells.

9. An apparatus as in claim 8, wherein said second axis is in the plane of the panel and passes through the center of gravity of the body.

10. An apparatus for modifying the position and attitude of a spacecraft subject to solar radiation and having a body with outer walls, comprising solar radiation responsive means movably mounted on the body outside the walls at positions offset from the center of gravity of the body and responsive to pressure from the solar radiation directed toward the body, said radiation responsive means including a pair of panels and a plurality of sheets, means for rotatably securing said sheets on said panels, said sheets and said panels having respective rotational axes in the plane of the panels and transverse to each other, said sheets being rotatable about their respective axes, said securing means having portions extending beyond the panels, along the respective rotational axes of said sheets, said sheets being mounted for rotation on the portions extending beyond the panels.

* * * * *